United States Patent Office 3,060,737
Patented Oct. 30, 1962

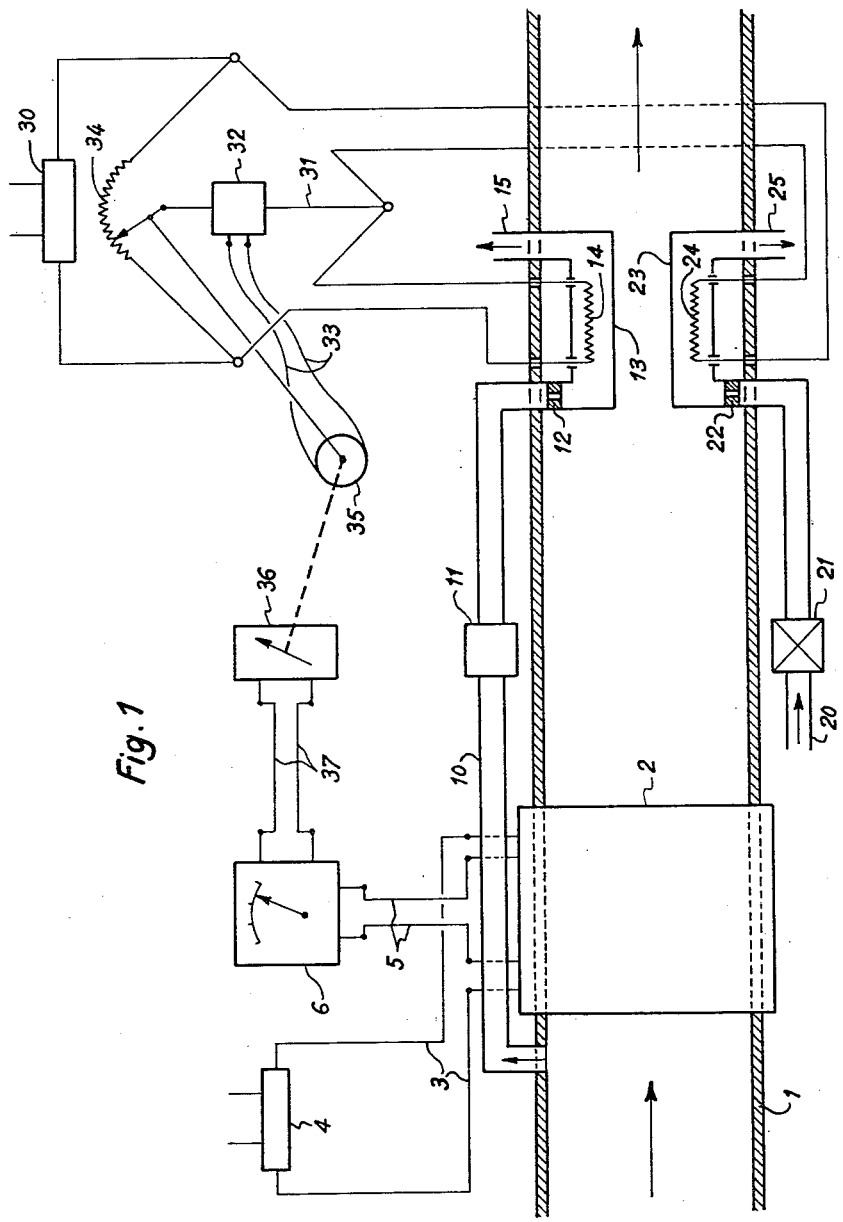

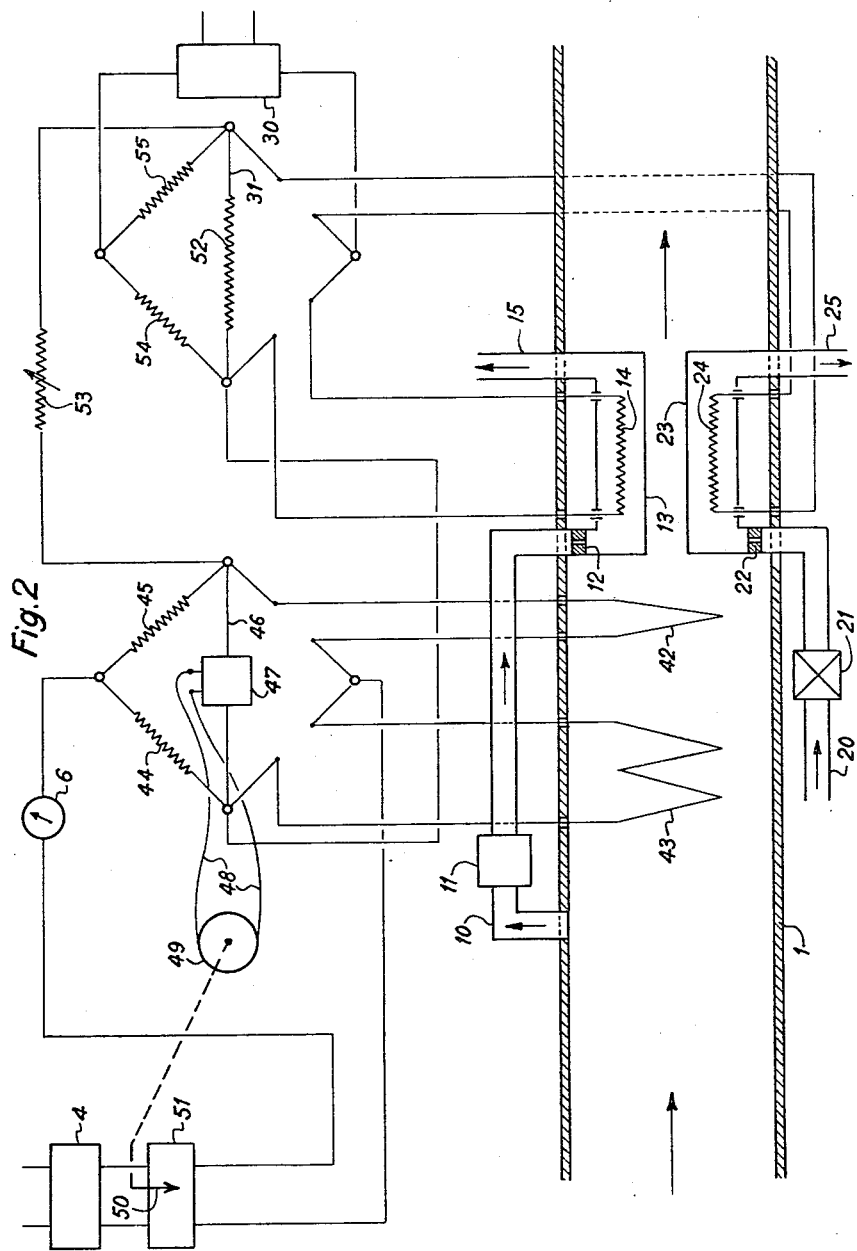

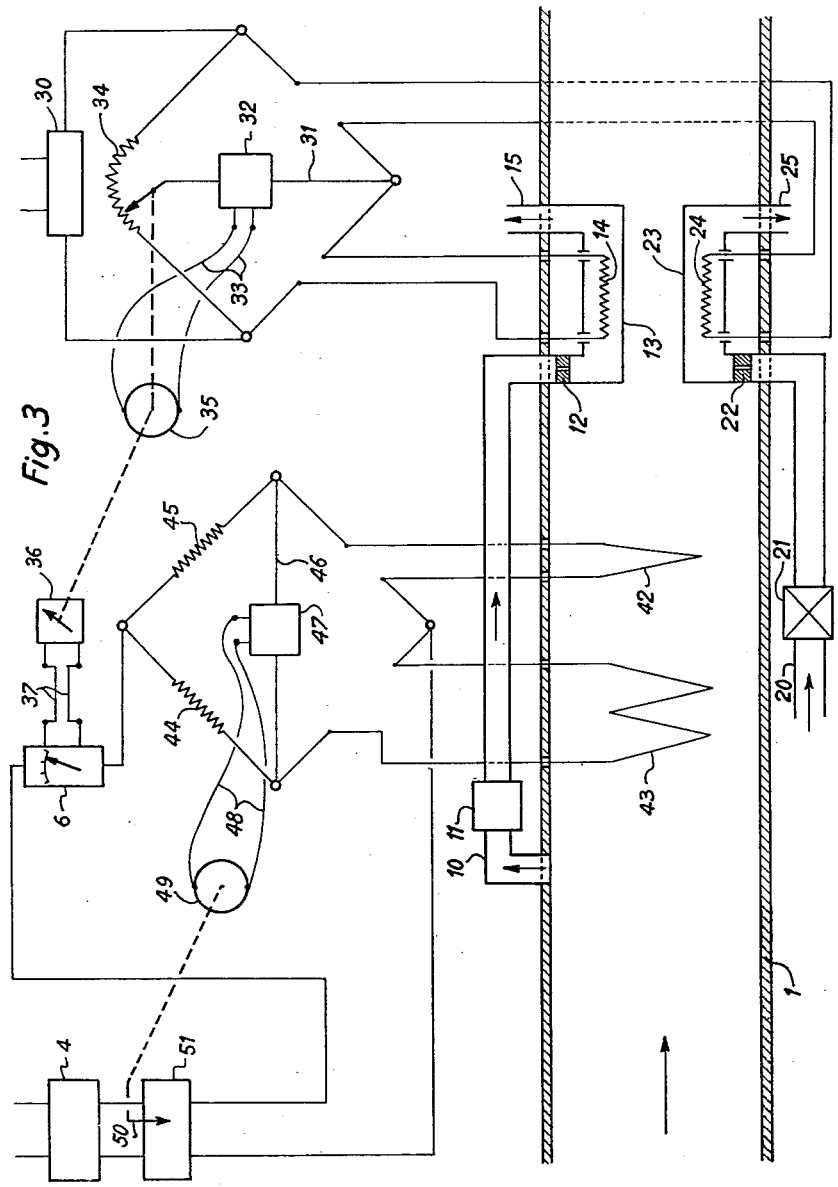

3,060,737
METHOD OF MEASURING THE FLOW OF FLUIDS OF VARIABLE COMPOSITION
Philippe Arragon, Asnieres, France, assignor to L'Air Liquide, Societe Anonyme pour l'Etude et l'Exploitation des Procedes Georges Claude, Paris, France
Filed Jan. 12, 1959, Ser. No. 786,304
Claims priority, application France Jan. 15, 1958
6 Claims. (Cl. 73—194)

As is known, the measurement of the flow of fluids and more especially gases by weight or volume can be effected in various ways, more especially by measuring the pressure drop as the fluid passes through a pressure-reducing member, diaphragm, nozzle or Venturi tube disposed in the fluid flow, or the temperature of a heated body disposed in the same flow. It is very convenient in all these cases, especially when it is desired to read the measurement at some distance from the point of measurement, to employ as the final indicating quantity an electrical quantity, the variation of which can be readily and continuously followed. However, no simple relation exists between the observed final electrical quantity and the rate of flow, and in practice the apparatus is calibrated before being used.

However, the above method is immediately applicable only when the flow of the fluid is the only quantity which can vary the reading of the instrument, that is to say, when the measuring fluid is a simple body or a mixture of fixed composition and therefore having constant physical properties. When this fluid is a mixture whose composition is capable of varying in the course of time, such as coke-oven gas, refinery gas or natural gas, its physical properties change at the same time. In the case of measurement by a pressure-reducing device, the weight flow rate depends not only upon the observed pressure drop, but also upon the specific mass of the fluid. In the case of measurement by a thermal method, the reading of the apparatus does not vary only with the weight flow rate, but in addition it depends upon the specific mass of the fluid, its specific heat, its thermal conductivity and its viscosity.

It is therefore convenient in the case of the measurement of the flow of gas mixtures of variable composition to calibrate the measuring instrument with the aid of a predetermined reference fluid and to correct its reading as a function of the difference between the physical properties of the fluid of which the flow is being measured and those of the reference fluid. This correction has heretofore been manually effected from tables or charts. It is true that automatic apparatus for the measurement of the physical properties concerned, such as automatic hydrometers, viscometers or analysers, are known, but these apparatus are complex and fragile and their adjustment must frequently be revised, and it has not heretofore been found possible to use them for a continuous correction of the readings of the instrument for the measurement of flow, especially as it is frequently difficult to determine the extent to which each of these physical properties is concerned in falsifying the value of the flow.

In contrast thereto, the method of the present invention permits of correcting in a simple and accurate manner the error due to the variation of the composition and consequently of the physical properties of a fluid in the measurement of the flow of the said fluid with the aid of an apparatus producing an electrical final indicating quantity, which is calibrated with a given reference fluid. It is characterized in that there are passed through two identical auxiliary tubes provided with identical electrical heating devices, at equal rates by volume, the reference fluid and a compensating fluid which is identical to the main fluid whose flow is to be measured, each flow being under the same temperature; in that the temperature difference of the electrical heating devices is measured with the aid of an electrical indicating quantity, and in that the indicating quantity of the main device is modified as a function of that of the auxiliary tubes.

When the temperature of the device submerged in the reference fluid remains constant, that of the device submerged in the compensating fluid varies with the composition of the latter. If, for example, it permits the passage of a higher flow of heat, the temperature of the device in contact therewith decreases, and the correction indicating quantity varies correspondingly.

The heating devices of the auxiliary tube preferably consist of electrically resistant wires disposed in the said devices symmetrically in relation to the axis, and the difference of the strengths of the currents flowing therethrough, or a quantity dependent thereon, is measured. If, for example, there flows through the resistant wire submerged in the reference fluid a current $i_1$, and if the compensating fluid has physical properties such that the heat loss of the resistant wire submerged therein is greater than that of the first wire, the temperature and consequently the resistance of the second wire decrease, and there flows through the latter a current $i_2$ greater than $i_1$. The difference $(i_2-i_1)$ can be recorded by a simple electrical device and the indicating quantity of the main measuring device can be corrected as a function of this difference.

In accordance with a preferred embodiment of the invention, the two resistant wires of the auxiliary tubes are placed in two adjacent arms of a Wheatstone bridge. The unbalance of the bridge in its diagonal is recorded and this indication is transmitted to the main measuring device.

The correcting signal sent to the main measuring device must, if possible, be proportional to the observed difference. Various transmission systems may be envisaged, by means of which this condition can be at least approximately satisfied. The first system consists in restoring the balance of the Wheatstone bridge with the aid of an automatic potentiometer comprising a servomechanism and controlled by a zero device disposed in the diagonal of the bridge, which restores the equilibrium of the latter by varying the resistances of the other two arms of the bridge, and transmits the correcting signal to a device which modifies the sensitivity of the main measuring device to the electrical quantity acting thereon.

Another transmission system, which is based upon a simpler principle, permits a less exact correction which is nevertheless sufficient in practice. It consists in allowing the unbalance of the Wheatstone bridge to subsist and transmitting to the main measuring device in the appropriate sense a voltage proportional to the unbalance voltage of the diagonal of the bridge.

The application of the correcting method according to the invention is particularly interesting when the flow is measured with the aid of the temperature of a heated body disposed in the stream of fluid. The variation of the various physical properties of the measuring gas in relation to those of the reference gas then takes place in exactly the same way in the measuring device and in the correcting device. An overall correction is effected as a function of the said variation, in the exact proportion in which each of the physical properties assist in falsifying the reading of the main instrument.

If the main instrument is a pressure-reducing member, for example a diaphragm, the specific mass of the fluid does not take effect with the same exponent as a factor of the pressure drop in the flow through the diaphragm, on the one hand, and of the heat loss of a heated resistance, on the other hand. However, the correcting signal may be converted with the aid of an accessory member of known type, such as a cam, so as to give the correction the appropriate amplitude.

There will hereinafter be described with reference to the accompanying drawings two devices for correcting the errors in the measurement of the flow of gases of variable composition, which permits application of the method of the invention, the correcting signal being transmitted to the main device through either one of the two above-defined systems.

FIGURE 1 illustrates a correcting device comprising a Wheatstone bridge, the balance of which is automatically maintained by a potentiometer acting simultaneously on a device which varies the sensitivity of the main device.

FIGURE 2 illustrates a correcting device which also comprises a Wheatstone bridge, but in which the bridge is left in the unbalanced state, the voltage across the terminals of the diagonal of the bridge being transmitted to the main device, which measures the flow by way of the temperature of a heated wire.

FIGURE 3 illustrates a correcting device similar to that of FIGURE 1, associated with a fluid-flow measuring device similar to that of FIGURE 2.

In FIGURE 1, the gas mixture whose flow is to be measured flows through the duct 1. A flow-measuring device 2 of any type is connected by electrical conductors 3 to a source of current of stabilised voltage 4. The reading of the device is electrically transmitted by wires 5 to an electrical measuring instrument, such as a galvanometer, which is calibrated with air having a known constant moisture content.

In addition, a very small fraction of the gas stream is tapped upstream or downstream of the instrument 2 through the auxiliary duct 10. The tapped gas flows through a pressure regulator 11, which fixes its pressure at a known constant value, which is higher than or double the atmospheric pressure, and then through a calibrated nozzle 12, which maintains its volumetric flow at a known constant value. It thereafter passes through the auxiliary tube 13 situated within the duct 1, so that its temperature remains equal to that of the gas in the duct. A heated platinum resistance 14 is disposed within the tube 13 symmetrically in relation to the axis. The said resistance consists, for example, of a platinum wire stretched along the axis of the tube or coiled on a non-conductive support symmetrical with the axis. The tapped gas thereafter escapes into the atmosphere at 15.

In addition, a small quantity of air having a constant moisture content equal to that of the air employed for the calibration of the instrument 2 is fed through a tube 20 and brought by the micro-compressor 21 to a pressure such that after passing through a calibrated nozzle 22 similar to the nozzle 12 the volumetric flow of air through the tube 23, disposed in the same manner as the tube 13 in the duct 1, is equal to the flow of gas through the tube 13. The tube 23 comprises a heated resistance 24 identical to the resistance 14 and disposed in the same way. The air escapes into the atmosphere at 25.

The resistances 14 and 24 are disposed in two adjacent arms of a Wheatstone bridge fed by a current source 30 at stabilised voltage. In the diagonal 31 of the said bridge, a zero galvanometer 32 controls through the conductors 33 a servomechanism 35 which automatically restores the balance of the bridge by acting on the potentiometer 34 in such manner as to vary the resistance of the other arms of the bridge. When the physical properties of the compensating gas in the tube 13, which is identical to the measuring gas in the duct, are such that the heat loss of the resistance 14 becomes different from that of the resistance 24 disposed in the air chosen as the reference gas, its temperature and its value are modified and the instrument 32 restores the balance of the bridge through the motor 35. At the same time, it transmits the reading of the correction effected to the instrument 36. This instrument, which is connected to the measuring galvanometer 6 by the wires 37, corrects its reading by varying its sensitivity to the current transmitted thereto by the wires 5.

In the apparatus illustrated in FIGURE 2, the measurement proper of the flow is effected with the aid of an instrument based on the heat loss of a heated wire disposed in the stream of gas. A heated resistance 42 is disposed in the duct 1, while another resistance 43 disposed in the same duct on the upstream side of the latter assumes the temperature of the gas. The resistances 42 and 43 are connected in two adjacent arms of a Wheatstone bridge comprising in addition two fixed resistances 44 and 45. Thus, the current flowing through the diagonal 46 of the said bridge is independent of the temperature of the gas.

On the other hand, a zero galvanometer 47 disposed in the said diagonal controls through wires 48 a motor 49 which varies with the aid of a slider 50 the feed voltage of the bridge supplied by a source 51 fed from a stabilised voltage-source 4. An ammeter 6 inserted in the feed circuit of the bridge and previously calibrated permits of directly reading the flow.

The apparatus for correcting the measurement as a function of the composition of the gas comprises, like that hereinbefore described, two auxiliary tubes 13 and 23 and two resistances 14 and 24 disposed in two similar arms of a Wheatstone bridge, but the transmission of the correcting signal to the main measuring instrument is effected in a different way. The diagonal 31 of the bridge comprises a high resistance 52. The voltage set up across the terminals of the said diagonal when the bridge is in the unbalanced state is transmitted through a circuit comprising a variable resistance 53 to the terminals of the diagonal of the bridge of the main instrument in the appropriate sense. If, for example, the physical properties of the measuring gas at a given instant are such that the heat loss of the heated resistances increases in contact therewith, the temperature of the measuring resistance 42 and consequently its value are lowered. There tends to be set up a current directed from right to left in the diagonal 46. However, the resistance 14, which is also in contact with the measuring gas, also decreases in value. There is set up a positive potential difference from left to right across the terminals of the diagonal 31 of the bridge of the auxiliary resistance. This potential difference is transmitted to the terminals of the diagonal 46 of the main bridge, in which it tends to cause the flow of a current from left to right. By an appropriate adjustment of the resistance 53, therefore, the error in the measurement can be approximately corrected.

In FIGURE 3, the gas mixture whose flow is to be measured flows through the duct 1. The fluid flow measuring device is similar to the one in FIG. 2, that is with the aid of an instrument based on the heat loss of a heated wire disposed in the stream of gas. A heated resistance 42 is disposed in the duct 1, while another resistance 43 disposed in the same duct on the upstream side of the latter assumes the temperature of the gas. The resistances 42 and 43 are connected in two adjacent arms of a Wheatstone bridge comprising in addition two fixed resistances 44 and 45. Thus the current flowing through the diagonal 46 of the said bridge is independent of the temperature of the gas.

On the other hand, a zero galvanometer 47 disposed in the said diagonal controls through wires 48 a motor 49 which varies with the aid of a slider 50 the feed voltage of the bridge supplied by a source 51 fed from a stabilised voltage-source 4. An ammeter 6 inserted in the feed circuit of the bridge and previously calibrated permits of directly reading the flow.

In addition, a very small fraction of the gas stream is tapped upstream of the fluid-flow measuring device, through the auxiliary duct 10. The tapped gas flows through a pressure regulator 11, which fixes its pressure at a known constant value, which is higher than or double the atmospheric pressure, and thus through a calibrated nozzle 12, which maintains its volumetric flow at a known constant value. It thereafter passes through the auxiliary tube 13 situated within the duct 1, so that its temperature remains equal to that of the gas in the duct. A heated platinum resistance 14 is disposed within the tube 13 symmetrically in relation to the axis. The said resistance consists, for example, of a platinum wire stretched along the axis of the tube or coiled on a non-conductive support symmetrical with the axis. The tapped gas thereafter escapes into the atmosphere at 15.

In addition, a small quantity of air having a constant moisture content equal to that of the air employed for the calibration of the fluid-flow measuring device is fed through a tube 20 and brought by the micro-compressor 21 to a pressure such that after passing through a calibrated nozzle 22 similar to the nozzle 12, the volumetric flow of air through the tube 23, disposed in the same manner as the tube 13 in the duct 1, is equal to the flow of gas through the tube 13. The tube 23 comprises a heated resistance 24 identical to the resistance 14 and disposed in the same way. The air escapes into the atmosphere at 25.

The resistances 14 and 24 are disposed in two adjacent arms of a Wheatstone bridge similar to the one in FIG. 1 fed by a current source 30 at stabilized voltage. In the diagonal 31 of the said bridge, a zero galvanometer 32 controls through the conductors 33 a servomechanism 35 which automatically restores the balance of the bridge by acting on the potentiometer 34 in such manner as to vary the resistance of the other arms of the bridge. When the physical properties of the compensating gas in the tube 13, which is identical to the measuring gas in the duct 1, are such that the heat loss of the resistance 14 becomes different from that of the resistance 24 disposed in the air chosen as the reference gas, the temperature and the value of resistance 14 are modified and galvanometer 32 restores the balance of the bridge through the meter 35. At the same time, it transmits the reading of the correction effected to the instrument 36. This instrument, which is connected to the measuring galvanometer 6 by the wires 37, corrects its reading by varying its sensitivity to the current transmittted thereto from the fluid-flow measuring device.

In addition to the above-described method, the invention comprises an apparatus for carrying out this method, such as those hereinbefore described, comprising two identical tubes, of which the first is branched from the fluid duct in which the flow is measured, and of which the second is connected to a reference fluid source, two identical electrical resistances each disposed along the axis of one of the tubes and each constituting one of the two adjacent arms of a Wheatstone bridge, and electrical members for recording the unbalance of the bridge and transmitting the correction signal to the device for indicating the flow.

What I claim is:

1. In a system for correcting any error upon measuring the mass rate of flow of a variable fluid mixture, comprising a tube to conduct said fluid mixture, flow-measuring means interposed in said tube for measuring as an electrical indication the flow rate of said mixture, means connected to said tube to conduct away from said tube a small fraction of said fluid mixture, means for heating said small fraction within second recited means, additional means for heating a reference fluid mixture, said heating means and additional heating means connected to a measuring means, and means to record as an electrical correcting indication the temperature difference of said heating means and said additional heating means and to correct the electrical indication of said flow-measuring means.

2. In a system according to claim 1 in which said flow-measuring means consists of an electrical resistance bridge having four arms in which two of the arms are disposed in said tube and the other two arms have fixed resistances, a voltage source connected to said bridge, and a diagonal in said bridge having therein a galvanometer actuating a servomotor for controlling said voltage source.

3. In a system according to claim 1 in which said measuring means consists of an electrical resistance bridge having four arms, two of said arms connected to said heating means, the other arms connected to a potentiometer, a diagonal in said bridge having therein a galvanometer and being connected to said potentiometer, said galvanometer actuating a servomotor thereby balancing said bridge and correcting the indication of said flow-measuring means.

4. In a system according to claim 1 in which said measuring means consists of an electrical resistance bridge having four arms, two of said arms connected to said heating means, the other two arms having therein resistances, a diagonal in said bridge having a resistance therein, means connecting the output of said bridge to said flow-measuring means for correcting the indication thereof.

5. In a system according to claim 1 in which said flow-measuring means consists of an electrical resistance bridge having four arms, two of said arms connected to resistances interposed in said tube, said other two arms having therein resistances, a diagonal in said bridge having therein a galvanometer actuating a servomotor, a variable voltage source connected to said bridge remote from said diagonal, said servomotor operatively connected to said variable voltage source for varying it; said measuring means consisting of another bridge having four arms, two of said arms connected to said heating means, the other two arms having resistances therein, a diagonal in said other bridge having a resistance therein, means connecting the diagonal of said other bridge to the diagonal of said bridge whereby the output from said other bridge corrects the output from said bridge as it varies said variable voltage source.

6. In a system according to claim 1 in which said flow-measuring means consists of an electrical resistance bridge having four arms, two of said arms connected to resistances interposed in said tube, said other two arms having therein resistances, a diagonal in said bridge having therein a galvanometer connected to a servomotor, a variable voltage source connected to said bridge remote from said diagonal, said servomotor operatively connected to said variable voltage source for varying it; said measuring means consisting of another bridge having four arms, two of said arms connected to said heating means, the other arms connected to a potentiometer, a diagonal in said other bridge having therein a galvanometer and being connected to said potentiometer, said galvanometer actuating a servomotor thereby balancing said other bridge and correcting the indication of said flow-measuring means.

References Cited in the file of this patent

UNITED STATES PATENTS

| | | |
|---|---|---|
| 1,691,600 | Brush | Nov. 13, 1928 |
| 1,751,715 | Peters | Mar. 25, 1930 |
| 2,591,759 | Zaickowsky | Apr. 8, 1952 |
| 2,617,299 | Ennis et al. | Nov. 11, 1952 |
| 2,624,199 | Boyer | Jan. 6, 1953 |
| 2,650,496 | Middleton et al. | Sept. 1, 1953 |
| 2,718,144 | Hornfeck | Sept. 20, 1955 |